(12) United States Patent
Nolan

(10) Patent No.: US 7,279,240 B2
(45) Date of Patent: Oct. 9, 2007

(54) LAMINATED PERPENDICULAR MAGNETIC RECORDING MEDIA WITH UNCORRELATED GRAINS

(75) Inventor: Thomas Patrick Nolan, Mountain View, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 225 days.

(21) Appl. No.: 10/764,499

(22) Filed: Jan. 27, 2004

(65) Prior Publication Data

US 2004/0253485 A1   Dec. 16, 2004

Related U.S. Application Data

(60) Provisional application No. 60/444,114, filed on Jan. 30, 2003.

(51) Int. Cl.
G11B 5/66   (2006.01)

(52) U.S. Cl. .................. 428/828; 428/829; 428/830

(58) Field of Classification Search ................ None
See application file for complete search history.

(56) References Cited

U.S. PATENT DOCUMENTS

| | | | |
|---|---|---|---|
| 4,810,592 A * | 3/1989 | Miyabayashi | 428/668 |
| 5,051,288 A | 9/1991 | Ahlert et al. | |
| 5,227,212 A | 7/1993 | Ahlert et al. | |
| 5,453,886 A * | 9/1995 | Kobayashi et al. | 360/46 |
| 5,567,523 A | 10/1996 | Rosenblum et al. | |
| 5,660,930 A * | 8/1997 | Bertero et al. | 428/332 |
| 5,851,643 A * | 12/1998 | Honda et al. | 428/212 |
| 5,900,324 A | 5/1999 | Moroishi et al. | |
| 6,372,330 B1 | 4/2002 | Do et al. | |
| 6,468,670 B1 * | 10/2002 | Ikeda et al. | 428/611 |
| 6,528,149 B2 | 3/2003 | Yoshida et al. | |
| 6,630,255 B1 * | 10/2003 | Litvinov et al. | 428/828 |
| 6,673,475 B2 | 1/2004 | Oikawa et al. | |
| 6,794,028 B2 | 9/2004 | Uwazumi et al. | |
| 7,067,206 B2 | 6/2006 | Uwazumi et al. | |
| 2002/0037439 A1 | 3/2002 | Litvinov et al. | |
| 2004/0099919 A1 * | 5/2004 | Schatz et al. | 257/421 |

FOREIGN PATENT DOCUMENTS

EP   0275447 A1   7/1988
WO   WO97/31370   8/1997

OTHER PUBLICATIONS

Derwent Abstract Translation of WO 2002/21545 A1 (Derwent Acc-No: 2002-425789).*

* cited by examiner

*Primary Examiner*—Kevin M. Bernatz
(74) *Attorney, Agent, or Firm*—McDermott Will & Emery LLP

(57) ABSTRACT

A laminated perpendicular magnetic recording medium comprises a non-magnetic substrate and at least a pair of polycrystalline, vertically stacked, spaced-apart perpendicular magnetic layers supported thereon, wherein each of the magnetic layers has substantially the same preferred out-of-plane crystal growth orientation and the grains of at least two of the magnetic layers are vertically uncorrelated with each other.

25 Claims, 3 Drawing Sheets

US 7,279,240 B2

LAMINATED PERPENDICULAR MAGNETIC RECORDING MEDIA WITH UNCORRELATED GRAINS

CROSS-REFERENCE TO PROVISIONAL APPLICATION

This application claims priority from U.S. provisional patent application Ser. No. 60/444,114 filed Jan. 30, 2003, the entire disclosure of which is incorporated herein by reference.

FIELD OF THE INVENTION

The present invention relates to high areal recording density, laminated perpendicular magnetic recording media with increased stability and signal-to-media noise ratio (SMNR), wherein magnetic grains of the laminated crystalline magnetic layers are uncorrelated, i.e., not in vertical registry, and have the same preferred out-of-plane crystal growth orientation, thereby enhancing the decrease in effective grain size provided by the laminated structure of the media. The invention is of particular utility in the design and manufacture of ultra-high areal recording density data/information storage and retrieval media, e.g., hard disks.

BACKGROUND OF THE INVENTION

Magnetic media are widely used in various applications, particularly in the computer industry, and efforts are continually made with the aim of increasing the areal recording density, i.e., bit density of the magnetic media. Conventional thin-film type magnetic recording media, wherein a fine-grained polycrystalline magnetic alloy serves as the active recording layer, are generally classified as "longitudinal" or "perpendicular", depending upon the orientation of the magnetic domains of the magnetic material of the recording layer. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Efficient, high bit density recording utilizing a perpendicular magnetic medium requires interposition of a relatively thick (i.e., as compared to the magnetic recording layer), magnetically "soft" underlayer or "keeper" layer, i.e., a magnetic layer having a relatively low coercivity below about 1 kOe, between a non-magnetic substrate, and a "hard" magnetic recording layer having relatively high coercivity of several kOe, typically about 3–6 kOe. The magnetically soft underlayer (e.g., of a NiFe alloy such as Permalloy) serves to guide magnetic flux emanating from the head through the hard, perpendicular magnetic recording layer, typically comprised of a Co-based alloy material, such as CoCr. In addition, the magnetically soft underlayer reduces susceptibility of the medium to thermally-activated magnetization reversal by reducing the demagnetizing fields which lower the energy barrier that maintains the current state of magnetization.

A typical conventional perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 3, 4, and 5, respectively, indicate a non-magnetic substrate, a soft magnetic underlayer, at least one non-magnetic interlayer, and a perpendicular hard magnetic recording layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the hard recording layer 5 and (2) promote desired microstructural and magnetic properties of the hard recording layer.

As shown by the arrows in the figure indicating the path of the magnetic flux φ, flux φ is seen as emanating from single pole 7 of single-pole magnetic transducer head 6, entering and passing through vertically oriented, hard magnetic recording layer 5 in the region below single pole 7, entering and travelling within soft magnetic underlayer 3 for a distance, and then exiting therefrom and passing through the perpendicular hard magnetic recording layer 5 in the region below auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of polycrystalline (i.e., granular) layers 4 and 5 of the layer stack constituting medium 1. Since magnetically hard main recording layer 5 is epitaxially formed on interlayer 4, the grain boundaries 9, hence the grains of each polycrystalline layer generally are of substantially the same width (as measured in a horizontal direction) and in vertical registry (i.e., vertically "correlated" or "aligned"). Thus, overlying polycrystalline layer 5 typically replicates the grain width of underlying layer 4 and is vertically aligned therewith. Completing the layer stack is a protective overcoat layer 11, such as of a diamond-like carbon (DLC) formed over hard magnetic layer 5, and a lubricant topcoat layer 12, such as of a perfluoropolyethylene material, formed over the protective overcoat layer.

Substrate 2 is typically disk-shaped and comprised of a non-magnetic metal or alloy, e.g., Al or an Al-based alloy, such as Al—Mg having an Ni—P plating layer on the deposition surface thereof, or substrate 2 is comprised of a suitable glass, ceramic, glass-ceramic, polymeric material, or a composite or laminate of these materials; underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, FeCoC, etc.; interlayer 4 typically comprises an up to about 300 Å thick layer of a non-magnetic material, such as TiCr; and hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, B, and Pd, iron nitrides or oxides, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2^{nd}$ type).

An improvement in the signal-to-media noise ratio (SMNR) and thermal stability of fine-grained, high areal recording density perpendicular magnetic recording media, such as illustrated in FIG. 1, is obtained by increasing the number of magnetic particles (grains)/unit area of the media, e.g., by decreasing the effective grain size. One approach for obtaining media with decreased effective grain size involves formation of laminated media (hereinafter designated "LM"), comprising two or more pairs of stacked magnetic layers wherein adjacent magnetic layers are spaced apart by a non-magnetic spacer layer, the non-magnetic spacer layers being thicker than those utilized in anti-ferromagnetically coupled (hereinafter designated "AFC") media. That is, in LM the spacer layer is provided for physically spacing and magnetically coupling rather than magnetically coupling the layers, and, as a consequence, the strength of any magnetic exchange coupling between the stacked ferromagnetic layers is much smaller than the magnetic energies of the grains of each layer.

Referring to FIG. 2, illustrated therein, in schematic, cross-sectional view, is a portion of a conventional perpendicular LM 20 having a structure generally similar to media 1 of FIG. 1, but wherein the layer stack has been modified to include a pair of laminated polycrystalline, perpendicular magnetic layers, comprising in overlying sequence from the first (or lower) polycrystalline perpendicular hard magnetic layer 5, a polycrystalline, non-magnetic spacer layer 13, e.g., an about 1 to about 20 nm thick layer of Cr, Ti, or a non-magnetic CoCr alloy, and a second (or upper) polycrystalline perpendicular hard magnetic layer 5'. As illustrated, the grain boundaries of the polycrystalline layers 4 and 5 designated by reference numeral 9 extend substantially vertically into the overlying polycrystalline, non-magnetic spacer layer 13 and the second (or upper) polycrystalline perpendicular hard magnetic layer 5', thereby indicating the substantially vertical correlation (i.e., vertical registry or alignment) and substantially same width of the grains of each overlying polycrystalline layer of the layer stack, including the laminated pair of polycrystalline, perpendicular magnetic layers 5 and 5'.

As indicated supra, in such conventional LM the laminated polycrystalline magnetic layers are spaced apart by means of polycrystalline, hetero-epitaxial non-magnetic spacer layers 13, such that the grains of each overlying polycrystalline layer, e.g., (1) a first (or lower) polycrystalline magnetic layer, (2) a polycrystalline, non-magnetic spacer layer, and (3) a second (or upper) polycrystalline, perpendicular magnetic layer, are of substantially the same width and substantially vertically correlated (i.e., in vertical registry or alignment). Stated differently, the crystallographic orientation and small grain size are maintained in each of the polycrystalline, perpendicular magnetic layers 5 and 5'. Unfortunately, however, the vertical correlation or registry of the grains of each of the polycrystalline, perpendicular magnetic layers induces magnetostatic coupling therebetween, wherein vertically correlated or aligned pairs of grains act as a single magnetic switching unit. As a consequence, the effective grain size is not reduced to the extent possible if the grains were not spatially, i.e., vertically, correlated.

According to another approach in the conventional art for improving SMNR, etc., of magnetic recording media, again involving formation of laminated media, the non-magnetic spacer layer(s) 13 does (do) not maintain the epitaxial growth orientation of the first (or lower) polycrystalline magnetic layer 5, and thus the grains of the second (or upper) polycrystalline magnetic layer 5' do not preserve the epitaxial growth orientation, hence vertical correlation or alignment with the first (or lower) polycrystalline magnetic layer 5. Thus, while in this instance, the positions of the grains in the second (or upper) polycrystalline magnetic layer 5' may be vertically uncorrelated (i.e., unaligned) with the grains of the first (or lower) polycrystalline magnetic layer 5, the optimized microstructure and crystallographic orientation of the first (or lower) polycrystalline magnetic layer 5 afforded by the underlying interlayer 4 are effectively absent in the second (or upper) polycrystalline magnetic layer 5', whereby the full benefit in grain size reduction obtainable by lamination with the first (or lower) polycrystalline magnetic layer 5 is lost.

In view of the foregoing, there exists a clear need for laminated perpendicular magnetic recording media (LM), wherein both the upper and lower polycrystalline, perpendicular magnetic layers are of optimal microstructure, such that the grains of each layer are crystallographically well oriented and positionally (i.e., vertically) uncorrelated with the grains of any other magnetic layer.

The present invention, therefore, addresses and solves problems attendant upon the design and manufacture of improved structures for perpendicular laminated media, which structures comprise at least a pair of laminated polycrystalline perpendicular magnetic layers separated by a polycrystalline, non-magnetic spacer layer.

DISCLOSURE OF THE INVENTION

An advantage of the present invention is an improved laminated perpendicular magnetic recording medium.

Another advantage of the present invention is an improved laminated perpendicular magnetic recording medium comprising vertically spaced-apart, strongly crystallographically growth oriented, polycrystalline, perpendicular magnetic recording layers with vertically uncorrelated grains.

A further advantage of the present invention is a method for fabricating an improved laminated perpendicular magnetic recording medium.

Still another advantage of the present invention a method for fabricating an improved laminated perpendicular magnetic recording medium comprising vertically spaced-apart, strongly crystallographically growth oriented, polycrystalline, perpendicular magnetic recording layers with vertically uncorrelated grains.

These and additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a laminated perpendicular magnetic recording medium, comprising a non-magnetic substrate and at least a pair of polycrystalline, vertically stacked, spaced-apart perpendicular magnetic layers supported thereon, wherein each of the magnetic layers has substantially the same preferred out-of-plane crystal growth orientation and the grains of at least two of the vertically stacked, polycrystalline, perpendicular magnetic layers are vertically uncorrelated with each other.

In accordance with embodiments of the present invention, the at least one pair of stacked magnetic layers are spaced apart by a non-magnetic, amorphous or nano-crystalline spacer layer; the magnetic layers are comprised of substantially the same material or of a different material; and the lattice parameters of the magnetic layers are substantially the same or are different.

According to a preferred embodiment of the present invention, each of the magnetic layers is comprised of an hcp material having a <0002> preferred out-of-plane growth orientation and a [0002] lattice parameter; e.g., each of the magnetic layers comprises a layer of a Co-based alloy material having a thickness from about 3 to about 20 nm and the non-magnetic spacer layer comprises a layer of an amorphous or nano-crystalline Ti-based alloy material having a thickness from about 1 to about 20 nm.

Embodiments of the invention include those wherein each of the magnetic layers is comprised of substantially the same or a different hcp <0002> material and the [0002] lattice parameter of each of the layers is substantially the same or different.

According to another preferred embodiment of the present invention, each of the magnetic layers is comprised of an fcc material having a <111> preferred out-of-plane growth orientation and a [111] lattice parameter; e.g., each of the magnetic layers comprises a multi-layer material selected from the group consisting of Co/Pt, Co/Pd, Fe/Pt, and Fe/Pd having a thickness from about 3 to about 20 nm, and the non-magnetic spacer layer comprises a layer of an amorphous or nano-crystalline Ti-based alloy material having a thickness from about 1 to about 20 nm.

Embodiments of the invention include those wherein each of the magnetic layers is comprised of substantially the same or a different fcc <111> material and the [111] lattice parameter of each of the layers is substantially the same or different.

In accordance with further preferred embodiments of the present invention, the medium further comprises a seed layer in contact with a lower surface of at least one of the magnetic layers, the seed layer comprising a material having a lowest interfacial energy with the at least one magnetic layer when the latter has the desired preferred out-of-plane crystal growth orientation.

According to particular embodiments of the present invention, the seed layer comprises a layer of an amorphous material selected from the group consisting of Ti-based alloys, FeCo alloys, FeNi alloys, CoNi alloys, and InSnO ("ITO") materials and having a thickness from about 1 to about 400 nm or a layer of a polycrystalline material selected from the group consisting of Ru, Ti, Ag, Au, Cu and alloys comprised of an fcc or hcp material and having a thickness from about 2 to about 20 nm.

Still further preferred embodiments of the present invention include those which comprise a soft magnetic underlayer in contact with a lower surface of a lowermost seed layer.

Another aspect of the present invention is a method of fabricating a laminated perpendicular magnetic recording medium, comprising steps of:

(a) providing a non-magnetic substrate having a surface; and (b) forming at least one pair of polycrystalline, vertically stacked, spaced-apart, perpendicular magnetic layers over the substrate surface, such that each of the magnetic layers has substantially the same preferred out-of-plane crystal growth orientation and the grains of at least two of the layers are vertically uncorrelated with each other.

According to the invention, step (b) comprises forming a non-magnetic, amorphous or nano-crystalline spacer layer between vertically adjacent ones of the stacked magnetic layers and forming the magnetic layers as comprised of substantially the same material or of different materials, and the lattice parameter of the magnetic layers are substantially the same or different.

Preferred embodiments of the present invention include those wherein step (b) comprises forming each of the magnetic layers as comprised of an hcp material having a <0002> preferred out-of-plane growth orientation and a [0002] lattice parameter; e.g., step (b) comprises forming each of the magnetic layers as comprised of a layer of a Co-based alloy material having a thickness from about 3 to about 20 nm and forming the non-magnetic spacer layer as comprised of a layer of an amorphous or nano-crystalline Ti-based alloy material having a thickness from about 1 to about 20 nm.

Further preferred embodiments of the present invention include those wherein step (b) comprises forming each of the magnetic layers as comprised of an fcc material having a <111> preferred out-of-plane growth orientation and a [111] lattice parameter; e.g., step (b) comprises forming each of the magnetic layers as comprised of a multilayer material selected from the group consisting of Co/Pt, Co/Pd, Fe/Pt, and Fe/Pd having a thickness from about 3 to about 20 nm, and forming the non-magnetic spacer layer as comprised of a layer of an amorphous or nano-crystalline Ti-based alloy material having a thickness from about 1 to about 20 nm.

According to yet further preferred embodiments of the present invention, step (b) further comprises forming a seed layer in contact with a lower surface of at least one of the magnetic layers, the seed layer comprising a material having a lowest interfacial energy with the at least one magnetic layer when the latter has the desired preferred out-of-plane growth orientation; e.g., step (b) comprises forming the seed layer as comprised of a layer of an amorphous material selected from the group consisting of Ti-based alloys, FeCo alloys, FeNi alloys, CoNi alloys, and InSnO ("ITO") materials and having a thickness from about 1 to about 400 nm or a layer of a polycrystalline material selected from the group consisting of Ru, Ti, Ag, Au, Cu and alloys comprised of an fcc or hcp material and having a thickness from about 1 to about 20 nm.

Still further preferred embodiments of the present invention include those wherein step (b) further comprises forming a soft magnetic underlayer in contact with a lower surface of a lowermost seed layer.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

Figure 1:
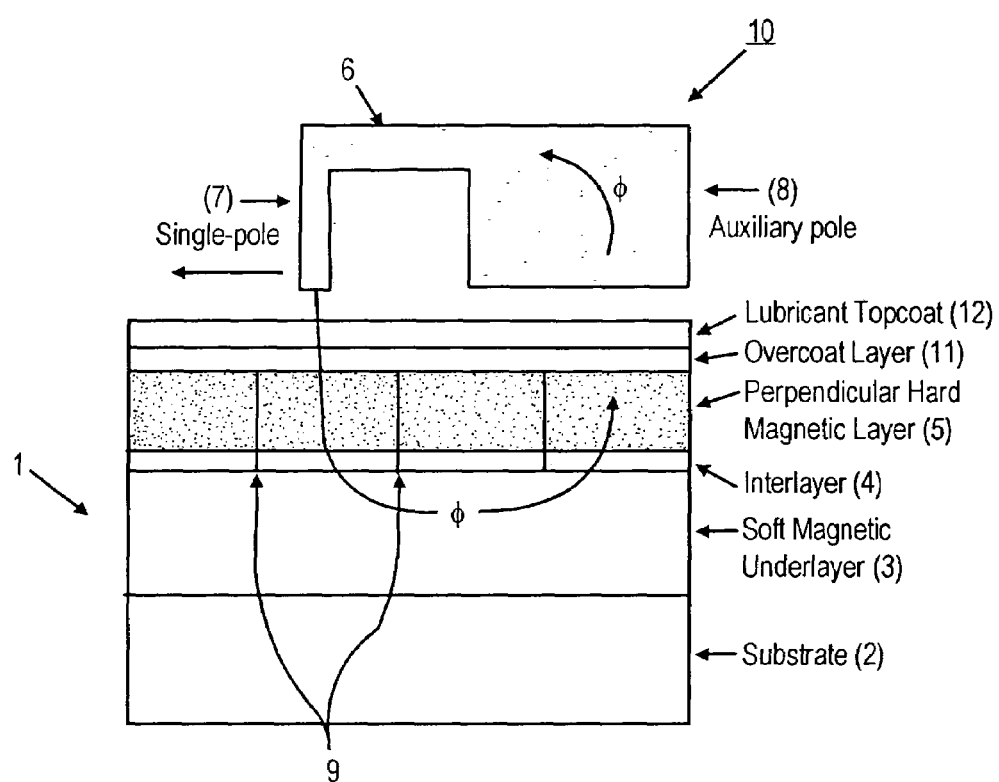
FIG. 1 schematically illustrates, in simplified cross-sectional view, a portion of a magnetic recording, storage, and retrieval system comprised of a single-pole transducer head and a conventional perpendicular type magnetic recording medium.

The present invention is based upon recognition by the inventor that high areal density perpendicular magnetic recording media having optimized performance characteristics, e.g., increased SMNR and stability, can be obtained by formation of improved structures for perpendicular laminated media, which structures comprise at least a pair of laminated polycrystalline, perpendicular magnetic layers separated by a non-magnetic, polycrystalline spacer layer, and each polycrystalline, perpendicular magnetic layer has the same preselected (or desired) preferred out-of-plane crystallographic growth orientation and the magnetic grains of the layers are positionally uncorrelated (i.e., not in vertical registration) with the grains of at least one other magnetic layer.

According to preferred embodiments of the invention, each laminated polycrystalline, perpendicular magnetic layer of the laminate has a strong hcp <0002> preferred out-of-plane growth orientation with a [0002] lattice parameter, or each laminated polycrystalline, perpendicular magnetic layer of the laminate has a strong fcc <111> preferred out-of-plane growth orientation with a [111] lattice parameter. In either instance, the magnetic grains of at least two laminated, polycrystalline, perpendicular magnetic layers are positionally uncorrelated (i.e., not in vertical registration).

The lowermost layer of the at least one pair of laminated polycrystalline, perpendicular magnetic layers is formed in contact with an underlying non-magnetic, amorphous seed layer or a non-magnetic polycrystalline seed layer having a desired preferred out-of-plane crystal growth orientation. The seed layer is, in turn, grown on an amorphous underlayer, e.g., a soft magnetic underlayer, and is comprised of a material having a lowest interface energy with the magnetic layer when the magnetic layer formed in overlying contact therewith has the desired preferred out-of-plane crystal growth orientation. The magnetic layer grows on the seed layer with the desired preferred out-of-plane growth orientation rather than by grain-to-grain epitaxy (as in the conventional art). As a consequence, the first (lowermost) magnetic layer has a strong perpendicular growth orientation and the grains are vertically uncorrelated (i.e., not in vertical alignment) with grains of an underlying layer. In this regard, the lowest energy polycrystalline interface in contact with an amorphous layer having similar nearest neighbor atomic spacing is often the closest-packed set of lattice planes, i.e., {0002} for hcp structures and {111} for fcc structures.

In addition, according to the invention, the amorphous spacer layer is between (but not necessarily in contact with) a pair of polycrystalline magnetic layers; and the spacer layer orients preferred growth of the overlying polycrystalline magnetic layer in a <111> or <0001> orientation because the lowest energy interface of many crystalline fcc and hcp materials with such amorphous metallic spacer layer is the close-packed plane, i.e., either fcc {111} or hcp {0002}.

The non-magnetic, amorphous or nano-crystalline spacer layer between each adjacent pair of polycrystalline, perpendicular magnetic layers of the laminate is comprised of a material having a lowest interface energy (for close-packed planes) with a polycrystalline, perpendicular magnetic layer with a desired preferred out-of-plane growth orientation formed in contact therewith. According to certain embodiments of the invention, the spacer layer is provided at an upper surface thereof with a polycrystalline seed layer having the desired preferred out-of-plane crystal growth orientation and a lowest interface energy (for close-packed planes) with a polycrystalline, perpendicular magnetic layer (i.e., the second, or upper layer of the pair) with a desired preferred out-of-plane crystal growth orientation formed in overlying contact therewith. As a consequence, the second (or upper) magnetic layer grows on the spacer layer, or on the polycrystalline seed layer formed on the spacer layer, with the desired preferred out-of-plane crystal growth orientation rather than by grain-to-grain epitaxy (as in the conventional art). The second (or upper) layer of the pair of magnetic layers thus has a strong perpendicular growth orientation and the grains are vertically uncorrelated (i.e., not in vertical alignment) with grains of the first (or lower) magnetic layer of the pair.

According to the invention, and as utilized herein, the expression "strong crystal growth orientation" refers to a relatively higher quality of a particular crystal growth orientation as determined by the size of symmetric X-ray diffraction peaks and/or measurement of the half width at half maximum (FWHM) of X-ray rocking curves.

Figure 2:
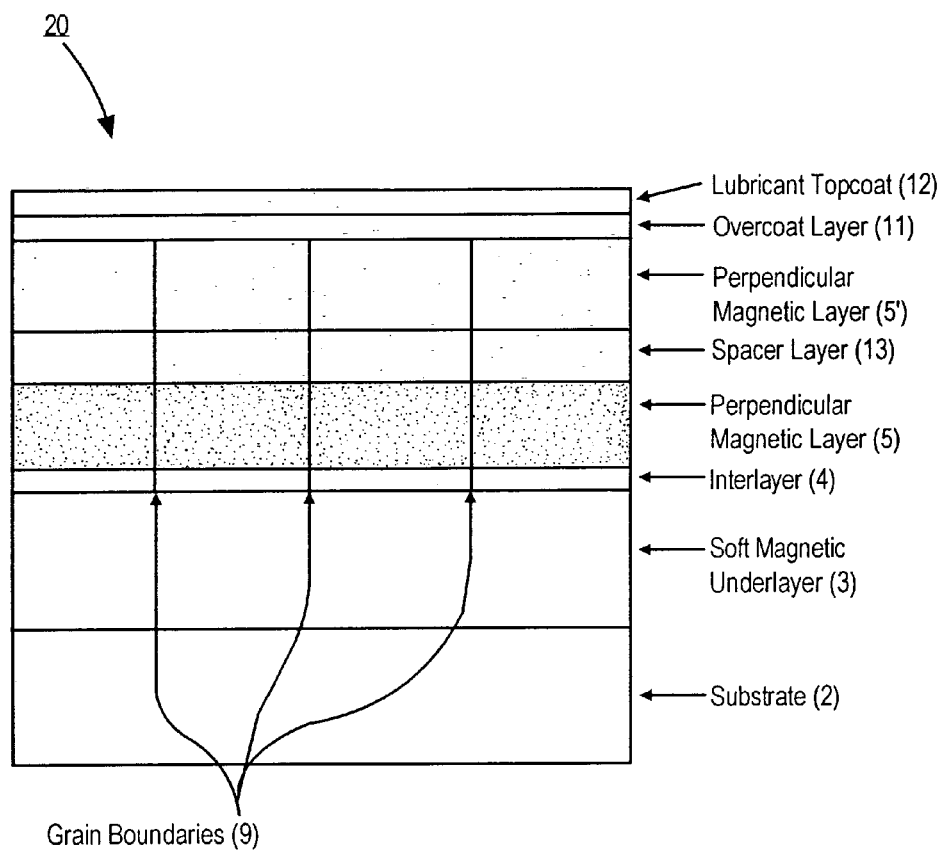
FIG. 2 schematically illustrates, in simplified cross-sectional view, a portion of a conventional laminated perpendicular type magnetic recording medium.
Figure 3:
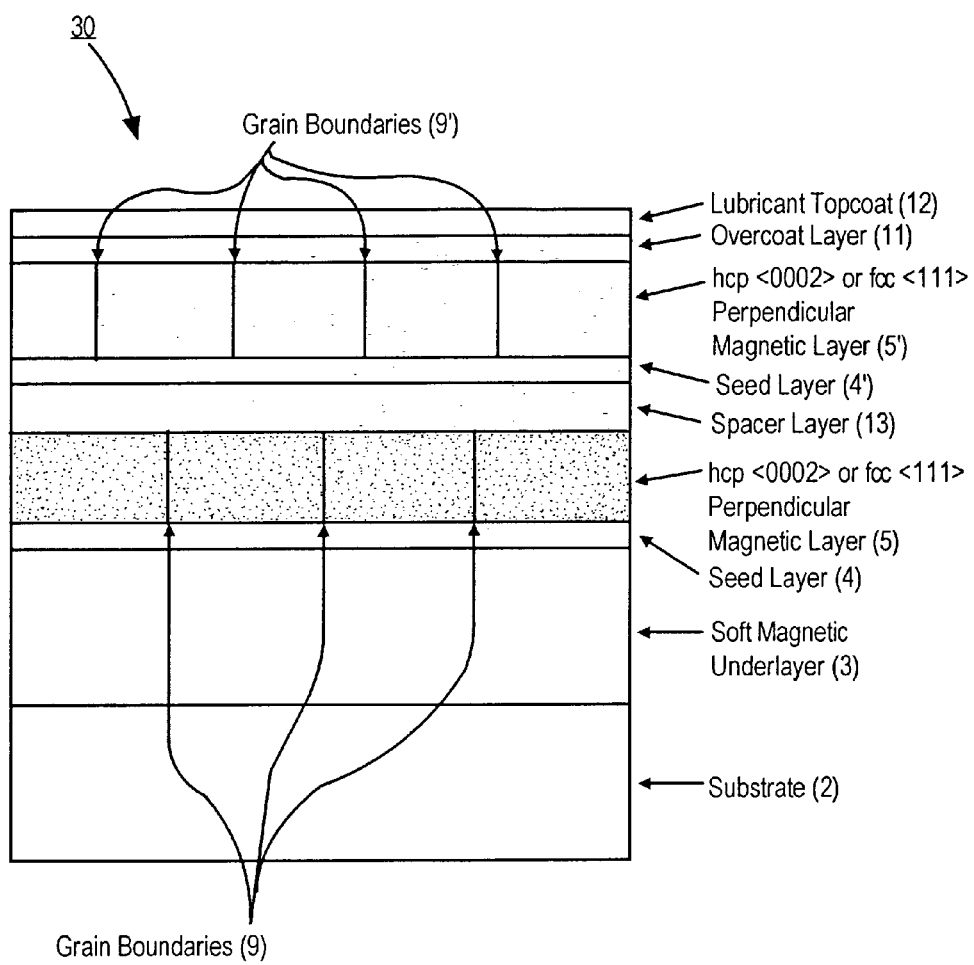
FIG. 3 schematically illustrates, in simplified cross-sectional view, a portion of a laminated perpendicular type magnetic recording medium according to an embodiment of the present invention.

Referring now to FIG. 3, schematically illustrated therein, in simplified cross-sectional view, is a portion of a laminated perpendicular magnetic recording medium 30 according to an embodiment of the present invention. Medium 30 according to the present invention is of generally similar structure to that of conventional laminated perpendicular medium 20 shown in FIG. 2. Specifically, medium 30 comprises a series of thin-film layers arranged in an overlying (stacked) sequence on a suitable non-magnetic substrate 2, and includes an optional soft magnetic underlayer 3 (i.e., not required in all embodiments of the invention); a polycrystalline, non-magnetic seed layer 4; and one or more laminated pairs of magnetically hard, polycrystalline, perpendicular magnetic layers separated by a non-magnetic spacer layer (only one pair is shown in the illustrated embodiment). According to the invention, each laminated pair comprises a first (or lower) polycrystalline, perpendicular magnetic layer 5 having a desired preferred out-of-plane crystal growth orientation, an amorphous or nano-crystalline, non-magnetic spacer layer 13, an optional polycrystalline, non-magnetic seed layer 4' (i.e., layer 4' is not required in all embodiments of the invention), and a second (or upper) polycrystalline, perpendicular magnetic layer 5' having the same desired preferred out-of-plane crystal growth orientation as the first (or lower) polycrystalline, perpendicular magnetic layer 5 but with crystal grains which are uncorrelated (i.e., not vertically aligned) with the crystal grains of the former layer (as indicated in FIG. 3 by laterally displaced grain boundaries 9 and 9'). Finally, medium 30 further comprises a protective overcoat layer 11 and a lubricant topcoat layer 12.

In accordance with embodiments of the present invention, e.g., as with hard disks, the non-magnetic substrate 2 is sufficiently thick as to provide medium 20 with a desired rigidity and comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof. Substrate 2 may further comprise, in overlying sequence from the surface thereof, a plating layer, e.g., of amorphous NiP when comprised of Al or an Al alloy such as Al—Mg, and an adhesion layer, e.g., of Cr, Cr—Ti, Ti, and TiNb.

Embodiments of the present invention include those wherein an amorphous, magnetically soft underlayer 3, from about 10 to about 400 nm thick, e.g., comprised of Fe containing at least one element selected from the group consisting of Co, B, P, Si, C, Zr, Nb, Hf, Ta, Al, Cu, Ag, and Au, is interposed between polycrstalline, non-magnetic seed layer 4 and substrate 2.

Seed layer 4, according to certain embodiments of the present invention, directly overlies substrate 2, and according to other embodiments of the invention, overlies amorphous, magnetically soft underlayer 3, and comprises a material having a low interfacial energy with the material of polycrystalline, perpendicular magnetic layer grown in contact therewith, such that crystal growth thereof occurs according to desired preferred out-of-plane crystal growth orientation. According to preferred embodiments of the present invention, seed layer 4 promotes a desired hcp <0002> or fcc <111> preferred out-of-plane crystal growth orientation.

According to particular embodiments of the present invention, the seed layer comprises a layer of an amorphous material selected from the group consisting of Ti-based alloys, FeCo alloys, FeNi alloys, CoNi alloys, and InSnO ("ITO") materials and having a thickness from about 1 to about 400 nm, or a layer of a polycrystalline material selected from the group consisting of Ru, Ti, Ag, Au, Cu and alloys comprised of an fcc or hcp material and having a thickness from about 1 to about 20 nm. According to preferred embodiments of the present invention, seed layer 4 possesses, hence promotes growth of the first (or lower) perpendicular magnetic layer 5 with the desired hcp <0002> or fcc <111> preferred out-of-plane crystal growth orientation.

First (or lower) polycrystalline, perpendicular magnetic layer 5 of the pair of laminated polycrystalline, perpendicular magnetic layers of the illustrated embodiment is, according to certain embodiments of the invention, preferably comprised of an hcp material having a <0002> preferred out-of-plane growth orientation and a [0002] lattice parameter. By way of illustration, but not limitation, polycrystalline, perpendicular magnetic layer 5 may comprise a layer of a Co-based alloy material having a thickness from about 3 to about 20 nm.

According to further embodiments of the present invention, first (or lower) perpendicular magnetic layer 5 of the pair of laminated polycrystalline, perpendicular magnetic layers of the illustrated embodiment is preferably comprised of an fcc material having a <111> preferred out-of-plane growth orientation and a [111] lattice parameter. For example, polycrystalline, perpendicular magnetic layer 5 may comprise a multi-layer material selected from the group consisting of Co/Pt, Co/Pd, Fe/Pt, and Fe/Pd having a thickness from about 3 to about 20 nm.

Amorphous or nano-crystalline, non-magnetic spacer layer 13 is formed in overlying contact with the first (or lower) polycrystalline, perpendicular magnetic layer 5, at a thickness from about 1 to about 20 nm. Suitable materials for layer 13 include amorphous or nano-crystalline Ti-based alloy materials, wherein the material of non-magnetic spacer layer 13 preferably has a short-range order ("SRO") parameter with a value similar to the value of the lattice parameter of the first (or lower) polycrystalline, perpendicular magnetic layer 5.

According to certain embodiments of the invention, the second (or upper) polycrystalline, perpendicular magnetic layer 5' is formed directly on the upper surface of spacer layer 13, whereas, according to other embodiments of the invention, the second (or upper) polycrystalline, perpendicular magnetic layer 5' is formed on the upper surface of a polycrystalline seed layer 4' which is itself formed directly on the upper surface of spacer layer 13. Seed layer 4' may comprise a layer of a polycrystalline material selected from the group consisting of Ru, Ti, Ag, Au, Cu and alloys comprised of a fcc or hcp material and having a thickness from about 2 to about 20 nm. According to preferred embodiments of the present invention, seed layer 4' possesses, hence promotes growth of, the second, or upper perpendicular magnetic layer 5' with the desired strong hcp <0002> or fcc <111> preferred out-of-plane crystal growth orientation.

Second (or upper) polycrystalline, perpendicular magnetic layer 5' of the pair of laminated polycrystalline, perpendicular magnetic layers of the illustrated embodiment is, according to certain preferred embodiments of the invention, comprised of an hcp material having a <0002> preferred out-of-plane growth orientation and a [0002] lattice parameter. By way of illustration, but not limitation, polycrystalline, perpendicular magnetic layer 5' may comprise a layer of a Co-based alloy material having a thickness from about 3 to about 20 nm.

According to certain other preferred embodiments of the present invention, the second (or upper) perpendicular magnetic layer 5' of the pair of laminated polycrystalline, perpendicular magnetic layers of the illustrated embodiment is comprised of an fcc material having a <111> preferred out-of-plane growth orientation and a [111] lattice parameter. For example, polycrystalline, perpendicular magnetic layer 5 may comprise a multi-layer material selected from the group consisting of Co/Pt, Co/Pd, Fe/Pt, and Fe/Pd having a thickness from about 3 to about 20 nm.

Preferred embodiments of the invention include those wherein the first (or lower) and the second (or upper) polycrystalline, perpendicular magnetic layers 5 and 5', respectively, are comprised of substantially the same or a different hcp <0002> material and the [0002] lattice parameter of each of the layers is substantially the same or different.

Further preferred embodiments of the invention include those wherein the first (or lower) and the second (or upper) polycrystalline, perpendicular magnetic layers 5 and 5', respectively, are comprised of substantially the same or a different fcc <111> material and the [111] lattice parameter of each of the layers is substantially the same or different.

Each of the thin film layers 3, 4, 5, 13, 4', 5' of the layer stack and protective overcoat layer 11 may be formed by means of at least one physical vapor deposition (PVD) method selected from sputtering, vacuum evaporation, ion plating, ion beam deposition (IBD), and plasma deposition, or at least one chemical vapor deposition method selected from CVD, MOCVD, PECVD, and lubricant topcoat layer 12 may be formed by means of at least one method selected from dipping, spraying, and vapor deposition.

According to the principles of the present invention, in instances where a soft magnetic underlayer 3 is initially formed over the surface of substrate 2, the non-magnetic seed layer 4 and the first (or lower) polycrystalline, perpendicular magnetic layer 5 are grown thereover with a desired preferred out-of-plane crystal growth orientation, preferably a strong hcp <0002> or fcc <111> orientation, owing to low interface energy in that orientation, and not by grain-to-grain epitaxy. As a consequence, the first (or lower) polycrystalline, perpendicular magnetic layer 5 has a strong hcp <0002> or fcc <111> growth orientation, and the grains thereof are vertically uncorrelated (i.e., not vertically aligned) with grains of any underlying magnetic layer, as indicated in FIG. 3 by the laterally displaced grain boundaries 9 and 9' of the respective first (or lower) and second (or upper) polycrystalline, perpendicular magnetic layers 5 and 5'.

Spacer layer 13 of a non-magnetic, amorphous or nano-crystalline material is then formed in overlying contact with the upper surface of first (or lower) polycrystalline, perpendicular magnetic layer 5. According to certain embodiments of the invention, the second (or upper) polycrystalline, perpendicular magnetic layer 5' is grown directly on the upper surface of non-magnetic, amorphous or nano-crystalline spacer layer 13, the material of non-magnetic spacer layer 13 preferably having a short-range order ("SRO") parameter with a value similar to the value of the lattice parameter of the second (or upper) polycrystalline, perpendicular magnetic layer 5'. According to other embodiments of the invention, the second (or upper) polycrystalline, perpendicular magnetic layer 5' is formed on the upper surface of a polycrystalline seed layer 4' which is itself formed directly on the upper surface of spacer layer 13, seed layer 4' possessing, and therefore, promoting growth of the second, or upper perpendicular magnetic layer 5' with the desired strong hcp <0002> or fcc <111> preferred out-of-plane crystal growth orientation. Growth of the second (or upper) perpendicular magnetic layer 5' with the strong hcp <0002> or fcc <111> preferred out-of-plane crystal growth orientation is enhanced by the low interface energy in that growth orientation.

According to the invention, therefore, spatially separated (i.e., laminated) structures comprising perpendicular magnetic layers having the same preferred out-of-plane crystal growth orientation and substantially similar microstructures can be fabricated without formation of vertically correlated (i.e., aligned) grains, as is observed for epitaxially grown laminated perpendicular magnetic layers. Moreover, the above-described lamination process can be repeated multiple times, as desired, to form a multilayer structure comprising three or more laminated perpendicular magnetic layers.

Thus, the present invention advantageously provides improved, high areal density, laminated perpendicular magnetic recording media with increased SMNR, wherein vertically uncorrelated grains of the laminated perpendicular magnetic layers afford optimal benefit of grain size reduction not obtainable with conventional, i.e., epitaxially formed, laminated perpendicular media. Further, the inventive media may be formed utilizing well-known technologies and instrumentalities readily adaptable to cost-effective, automated manufacture of magnetic recording media.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concepts as expressed herein.

What is claimed is:

1. A laminated perpendicular magnetic recording medium, comprising a non-magnetic substrate and at least a pair of polycrystalline, vertically stacked, spaced-apart perpendicular magnetic layers supported thereon wherein said at least one pair of stacked magnetic layers are vertically spaced apart by an amorphous spacer layer; wherein each of said magnetic layers has the same preferred out-of-plane crystal growth orientation and the grain boundaries of at least two of said magnetic layers closest to a common spacer layer in overlying sequence are not in vertical alignment with each other by virtue of having laterally displaced, uncorrelated grain boundaries.

2. The medium as claim 1, wherein said spacer layer is a non-magnetic spacer layer.

3. The medium as in claim 2, wherein said magnetic layers are comprised of the same material.

4. The medium as in claim 2, wherein said magnetic layers are comprised of different materials.

5. The medium as in claim 2, wherein the lattice parameters of said magnetic layers are the same.

6. The medium as in claim 2, wherein the lattice parameters of said magnetic layers are different.

7. The medium as in claim 2, wherein each of said magnetic layers is comprised of an hcp material having a <0002> preferred out-of-plane growth orientation and a [0002] lattice parameter.

8. The medium as in claim 7, wherein each of said magnetic layers comprises a layer of a Co-based alloy material having a thickness from about 3 to about 20 nm and said non-magnetic spacer layer comprises a layer of an amorphous Ti-based alloy material having a thickness from about 1 to about 20 nm.

9. The medium as in claim 7, wherein each of said magnetic layers is comprised of the same hcp <0002> material and the [0002] lattice parameter of each of said layers is the same.

10. The medium as in claim 2, wherein each of said magnetic layers is comprised of an fcc material having a <111> preferred out-of-plane growth orientation and a [111] lattice parameter.

11. The medium as in claim 10, wherein each of said magnetic layers comprises a multi-layer material selected from the group consisting of Co/Pt, Co/Pd, Fe/Pt, and Fe/Pd having a thickness from about 3 to about 20 nm, and said non-magnetic spacer layer comprises a layer of an amorphous Ti-based alloy material having a thickness from about 1 to about 20 nm.

12. The medium as in claim 10, wherein each of said magnetic layers is comprised of the same fcc <111> material and the [111] lattice parameter of each of said layers is the same.

13. The medium as in claim 1, farther comprising a seed layer in contact with a lower surface of at least one of said magnetic layers, said seed layer comprising a material having a lowest interfacial energy with said at least one magnetic layer when the latter has the desired preferred out-of-plane crystal growth orientation.

14. The medium as in claim 13, where said seed layer comprises a layer of an amorphous material selected from the group consisting of Ti-based alloys, FeCo alloys, FeNi alloys, CoNi alloys, and InSnO (ITO) materials and having a thickness from about 1 to about 400 nm or a layer of a polycrystalline material selected from the group consisting of Ru, Ti, Ag, Au, Cu, and alloys comprised of a fcc or hcp material and having a thickness from about 1 to about 20 nm.

15. The medium as in claim 13, further comprising a soft magnetic underlayer in contact with a lower surface of a lowermost seed layer.

16. A method of fabricating a laminated perpendicular magnetic recording medium, comprising steps of:
    (a) providing a non-magnetic substrate having a surface; and
    (b) forming at least a pair of polycrystalline, vertically stacked, spaced-apart, perpendicular magnetic layers over said surface wherein said at least one pair of stacked magnetic layers are vertically spaced apart by an amorphous spacer layer, such that each of said magnetic layers has the same preferred out-of-plane crystal growth orientation and the grain boundaries of at least two of said magnetic layers closest to a common spacer layer in overlying sequence; and are not in vertical alignment with each other by virtue of having laterally displaced, uncorrelated grain boundaries.

17. The method according to claim 16, wherein:
    said spacer layer a non-magnetic layer.

18. The method according to claim 17, wherein:
    step (b) comprises forming said magnetic layers as comprised of the same material, and the lattice parameters of said magnetic layers are the same.

19. The method according to claim 18, wherein:
    step (b) comprises forming each of said magnetic layers as comprised of an hcp material having a <0002> preferred out-of-plane growth orientation and a [0002] lattice parameter.

20. The method according to claim 19, wherein:
    step (b) comprises forming each of said magnetic layers as comprised of a layer of a Co-based alloy material having a thickness from about 3 to about 20 nm and forming said non-magnetic spacer layer as comprised of a layer of an amorphous Ti-based alloy material having a thickness from about 1 to about 20 nm.

21. The method according to claim 18, wherein:
    step (b) comprises forming each of said magnetic layers as comprised of an fcc material having a <111> preferred out-of-plane growth orientation and a [111] lattice parameter.

22. The method according to claim 21, wherein:
    step (b) comprises forming each of said magnetic layers as comprised of a multilayer material selected from the group consisting of Co/Pt, Co/Pd, Fe/Pt, and Fe/Pd having a thickness from about 3 to about 20 nm, and forming said non-magnetic spacer layer as comprised of a layer of an amorphous Ti-based alloy material having a thickness from about 1 to about 20 nm.

23. The method according to claim 16, wherein:
    step (b) further comprises forming a seed layer in contact with a lower surface of at least one of said magnetic layers, said seed layer comprising a material having a lowest interfacial energy with said at least one magnetic layer for when the latter has the desired preferred out-of-plane crystal growth orientation.

24. The method according to claim 23, wherein:
    step (b) comprises forming said seed layer as comprised of a layer of an amorphous material selected from the group consisting of Ti-based alloys, FeCo alloys, FeNi alloys, CoNi alloys, and InSnO (ITO) materials and having a thickness from about 1 to about 400 nm or a layer of a polycrystalline material selected from the group consisting of Ru, Ti, Ag, Au, Cu, and alloys comprised of a fcc or hcp material and having a thickness from about 1 to about 20 nm.

25. The method according to claim 23, wherein:
    step (b) still further comprises forming a soft magnetic underlayer in contact with a lower surface of a lowermost seed layer.

* * * * *